United States Patent [19]

Luduena

[11] 3,725,552
[45] Apr. 3, 1973

[54] METHOD OF PRODUCING NASAL VASOCONSTRICTION

[75] Inventor: Froilan P. Luduena, Albany, N.Y.

[73] Assignee: Sterling Drug Inc., New York, N.Y.

[22] Filed: Oct. 28, 1970

[21] Appl. No.: 84,887

Related U.S. Application Data

[62] Division of Ser. No. 720,362, April 10, 1968, abandoned.

[52] U.S. Cl. ................................................424/330
[51] Int. Cl. ...........................................A61k 27/00
[58] Field of Search......................................424/330

[56] References Cited

OTHER PUBLICATIONS

Goodman & Gilman – The Pharmacological Basis of Therapeutics – 3rd Edit. (1965) pages 483–486.

*Primary Examiner*—Sam Rosen
*Attorney*—Elmer J. Lawson, B. Woodrow Wyatt, Thomas L. Johnson, Robert K. Bair, William G. Webb, Frederik W. Stonner, Roger T. Wolfe and Lynn T. Fletcher

[57] ABSTRACT

Method of producing nasal vasoconstriction in a warm-blooded mammal by oral administration of an ar-amio alcohol, preferably the m-amino species.

3 Claims, No Drawings

METHOD OF PRODUCING NASAL VASOCONSTRICTION

This application is a division of my prior co-pending application Ser. No. 720,362, filed Apr. 10, 1968 and now abandoned.

This invention relates to a method for producing nasal vasoconstriction in warm-blooded mammals and to compositions of matter having nasal vasoconstrictor activity.

The invention sought to be patented, in its method aspect, resides in the concept of the method of producing nasal vasoconstriction in a warm-blooded mammal which comprises orally administering to said mammal an effective amount of an ar-amino-alpha-(1-aminoethyl)benzyl alcohol having in the free base form the formula:

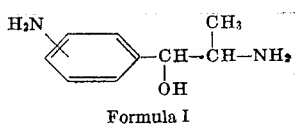

Formula I

The ar-amino-alpha-(1-aminoethyl)benzyl alcohols of Formula I are o-amino-alpha-(1-aminoethyl)benzyl alcohol, m-amino-alpha-(1-aminoethyl)benzyl alcohol, and p-amino-alpha-(1-aminoethyl)benzyl alcohol.

The invention sought to be patented, in its composition aspect, resides in the concept of the novel chemical compound m-amino-alpha-(1-aminoethyl)benzyl alcohol having in the free base form the formula:

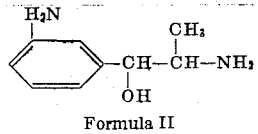

Formula II

This compound has useful nasal vasoconstrictor properties when administered orally to warm-blooded mammals and is the preferred species of ar-amino-alpha-(1-aminoethyl)benzyl alcohol used in the practice of the method aspect of this invention.

Due to the presence of the two basic amino groupings, the free base forms of Formula I above react with organic and inorganic acids to form acid-addition salts. The acid-addition salt forms are prepared from any organic or inorganic acid. They are obtained in conventional fashion, for instance either by direct mixing of the base with the acid or, when this is not appropriate, by dissolving either or both of the base and the acid separately in water or an organic solvent and mixing the two solutions, or by dissolving both the base and the acid together in a solvent. The resulting acid-addition salt is isolated by filtration, if it is insoluble in the reaction medium, or by evaporation of the reaction medium to leave the acid-addition salt as a residue. The acid moieties or anions in these salt forms are in themselves neither novel nor critical and therefore can be any acid anion or acid-like substance capable of salt formation with the base.

Representative acids for the formation of the acid-addition salts include formic acid, acetic acid, isobutyric acid, alpha-mercaptopropionic acid, trifluoroacetic acid, malic acid, fumaric acid, succinic acid, succinamic acid, tannic acid, glutamic acid, tartaric acid, oxalic acid, pyromucic acid, citric acid, lactic acid, glycolic acid, gluconic acid, saccharic acid, ascorbic acid, penicillin, benzoic acid, phthalic acid, salicylic acid, 3,5-dinitrobenzoic acid, anthranilic acid, cholic acid, 2-pyridine-carboxylic acid, pamoic acid, 3-hydroxy-2-naphthoic acid, picric acid, quinic acid, tropic acid, 3-indoleacetic acid, barbituric acid, sulfamic acid, methanesulfonic acid, ethane-sulfonic acid, isethionic acid, benzenesulfonic acid, p-toluenesulfonic acid, butylarsonic acid, methanephosphonic acid, acidic resins, hydrofluoric acid, hydrochloric acid, hydrobromic acid, hydriodic acid, perchloric acid, nitric acid, sulfuric acid, phosphoric acid, arsenic acid, and the like.

All of the acid-addition salts are useful as sources of the free base form, by reaction with an inorganic base. It will thus be appreciated that if one or more of the characteristics, such as solubility, molecular weight, physical appearance, toxicity, or the like of a given base or acid-addition salt thereof render that form unsuitable for the purpose at hand, it can be readily converted to another, more suitable form. In the practice of the method of this invention, when the ar-amino-alpha-(1-aminoethyl)-benzyl alcohol is in the form of an acid-addition salt, there is used a salt with a relatively non-toxic, pharmaceutically-acceptable acid, for example hydrochloric acid, lactic acid, tartaric acid, and the like.

The manner and process of making and using the invention, and the best mode contemplated by the inventor of carrying out this invention, will now be described so as to enable any person skilled in the art to which it pertains to make and use the same.

In carrying out the method aspect of this invention the above-identified ar-amino-alpha-(1-aminoethyl)benzyl alcohols are orally administered in the same manner as the presently-available known nasal vasoconstrictor agents such as alpha-(1-aminoethyl)benzyl alcohol, phenylephrine, ephedrine, and pseudoephedrine which find particular application in relief of nasal congestion. Thus they can be used with any of the pharmaceutically acceptable carriers conventionally employed for oral administration of such agents. Ordinarily, they are combined with conventional pharmaceutical solid or liquid diluents and carriers in tablets, capsules, syrups, emulsions, or the like. These formulations can contain any of the usual excipients as water, lactose, starch, magnesium stearate, talc, gelatin, calcium carbonate, gums, and the like.

The individual unit dosage can be varied as desired. For general use I prefer to incorporate, in a solid vehicle, about 10 to 20 mg. of the ar-amino-alpha-(1-aminoethyl)-benzyl alcohol per tablet or capsule; or, in a liquid vehicle, about 10 to 20 mg. of the ar-amino-alpha-(1-aminoethyl)-benzyl alcohol per teaspoonful. The effective oral dose for producing nasal vasoconstriction is in the approximate range 0.1 – 0.35 mg./kg.

The ar-amino-alpha-(1-aminoethyl)benzyl alcohols employed in the practice of the method aspect of this invention are readily obtained by conventional general processes. Thus, for example, they are obtained in one method by reducing the corresponding ar-nitro-alpha-(1-aminoethyl)benzyl alcohols; in a second method by reducing an ar-(acylamino or nitro)-alpha-oximinopropiophenone; and in a third method by catalytically hydrogenating ar-nitro-alpha-(dibenzylamino)propiophenone. The preparation of p- amino-alpha-(1-aminoethyl)benzyl alcohol by the first method is described in the U.S. Pat. No. 1,898,258, issued Feb. 21, 1933 to Max Oberlin, and by the second method is described in U.S. Pat. No. 2,567,906, issued Sept. 11, 1951 to Walter H. Hartung. The third method of preparation is illustrated as follows.

Preparation of m-Amino-alpha-1-(aminoethyl)benzyl Alcohol

A solution of 96.5 g. of m-nitro-alpha-bromopropiophenone in 600 ml. of acetonitrile was stirred while 147.5 g. of dibenzylamine was dripped in over a period of one-half hour. The mixture was stirred for sixteen hours at room temperature and then filtered. The solid thus collected was washed with ether. The filtrate and ether wash were combined and evaporated under reduced pressure at not more than 45°C. The resulting residue was dissolved in 500 ml. of ether, washed with three 300 ml. portions of water, dried over anhydrous magnesium sulfate, and acidified to pH 2.0 with ethanolic hydrogen chloride. The solid which precipitated was collected on a filter and washed with a small amount of absolute ether to yield m-nitro-alpha-dibenzylaminopropiophenone hydrochloride as a curdy, light-yellow solid, m.p. 151°-152°C. (dec.), which weighed 101.5 g.

A slurry of 60.0 g. of m-nitro-alpha-dibenzylaminopropiophenone hydrochloride in 600 ml. of absolute ethanol was hydrogenated at room temperature with 3.0 g. of 10 percent palladium-on-charcoal catalyst with hydrogen under 1-3 atmospheres pressure. The reduction required about 24 hours during which time 108 percent of the calculated amount of hydrogen was absorbed. The reduction mixture was filtered and acidified to pH 1.0 with ethanolic hydrogen chloride. Evaporation of roughly one-third of the solvent on a steam bath gave a fine crystalline suspension. Cooling afforded precipitated material which was isolated on a filter, washed well with ether and dried under reduced pressure for twelve hours at 50°C. There was thus obtained 19.9 g. of m-amino-alpha-(1-aminoethyl)-benzyl alcohol dihydrochloride as a white crystalline solid which melted at 263°-264°C. (dec.).

By treatment of the base dihydrochloride with two equivalents of sodium hydroxide there is obtained the free base, m-amino-alpha-(1-aminoethyl)benzyl alcohol. This base is readily converted to any desired acid-addition salt by treatment in conventional manner with the appropriate acid.

Proceeding in the manner of the above example but using as the starting material o-nitro-alpha-bromopropiophenone in place of m-nitro-alpha-bromopropiophenone, there is obtained o-amino-alpha-(1-aminoethyl)benzyl alcohol.

As produced in the above examples, the ar-amino-alpha-(1-aminoethyl)benzyl alcohol products are in the racemic form which, if desired, can be resolved into the dextro and levo forms by application of the general principles known in the resolution art.

The ar-amino-alpha-(1-aminoethyl)benzyl alcohols used in the practice of this invention show nasal vasoconstrictor activity when administered orally to rabbits using the following pharmacological test procedure which incorporates the sneeze reflex method described in Nieschulz, et al., Arzneimittelforschung, 8, 539-544 (1958):

A solution of the test compound in physiological saline solution (0.25 ml.) is administered orally and 1 hour later 0.25 ml. of a 1 percent aqueous solution of tetracaine is instilled into one nostril of each test rabbit, using polyethylene tubing (Clay-Adams PE60) 2 cm. in length, with occluded tip and multiple side perforations. The presence or absence of the sneeze reflex before and at five minute intervals after tetracaine application is used to indicate the presence or absence of anesthesia. The sneeze reflex is elicited by touching lightly the septum inside the nasal cavity of the test rabbit with a piece of polyethylene tubing, the tip of which had been blunted with wax.

The doses of test compound are graded at 0.5 logarithmic intervals. Each concentration of test compound is administered to ten rabbits. If the duration of tetracaine anesthesia is significantly longer than the mean control values for tetracaine, two hours after the administration of the test drug, 0.25 ml. of a 1 percent aqueous solution of tetracaine is instilled into the other nostril of each test rabbit. By comparing the dose-effect curves of the test compound with the dose-effect curves of a reference nasal vasoconstrictor drug, alpha-(1-aminoethyl)benzyl alcohol in the tests tabulated below, approximate activity ratios can be obtained.

TABLE 1

Nasal Vasoconstriction
Oral Administration in Rabbits

| Compound | Oral dose mg/kg (10 rabbits/dose) | Time interval between vasoconst. & tetracaine admins. (in hours) | Avg. duration of tetracaine (1%) anesthesia (topical nasal application) (in minutes)** |
|---|---|---|---|
| m-Amino-alpha-(1-aminoethyl)-benzyl alcohol dihydrochloride | 5 | 1 | 23.2 |
| | 10 | 1 | 31.7 |
| | 20* | 1 | 37.5 |
| | 5* | 1 | 27.5 |
| | 10* | 1 | 32.5 |
| | 20* | 1 | 37.5 |
| | 20* | 2 | 35.0 |
| | 20* | 3 | 26.0 |
| p-Amino-alpha-(1-aminoethyl)-benzyl alcohol dihydrochloride | 10 | 1/2 | 25.0 |
| | 20 | 1/2 | 32.5 |
| | 40 | 1/2 | 36.7 |
| | 10 | 1 | 37.5 |
| | 10 | 2 | 22.5 |
| | 20 | 1 | 38.3 |
| | 20 | 2 | 28.3 |
| Reference Drug: alpha-(1-aminoethyl)benzyl alcohol hydrochloride | 10 | 1 | 24 |
| | 20 | 1 | 29 |
| | 40 | 1 | 35 |
| | 20 | 2 | 30 |
| | 20 | 3 | 22.5 |

* Dose in terms of the base
** Control duration of tetracaine (1%): 18 minutes m-Amino-alpha-(1-aminoethyl)benzyl alcohol and p-amino-alpha-(1-aminoethyl)benzyl alcohol were tested for systematic toxicity in rats and mice, with the following results.

TABLE 2

Systemic Toxicity
ALD50 or LD50 (mg/kg)*

| Species | Route of Admin. | Compound I | Compound II | Reference Drug |
|---|---|---|---|---|
| Rat | oral | ALD50 >4000 | 5000 | LD50 1050 ± 250 |
| | i.v. | LD50, 172 ± 14 | 108 ± 13 | LD50 100 ± 5 |
| Mouse | i.v. | LD50, 200 ± 17 | 186 ± 16 | LD50 131 ± 8 |

Compound I : m-amino-alpha-(1-aminoethyl)benzyl alcohol dihydrochloride.
Compound II : p-amino-alpha-(1-aminoethyl)benzyl alcohol dihydrochloride.
Reference Drug : alpha-(1-aminoethyl)benzyl alcohol hydrochloride.
* Results computed 7 days after drug administration.

The number of deaths/rabbits tested (oral administration) was as follows: m-Amino-alpha-(1-aminoethyl)-benzyl alcohol dihydrochloride, at 40 mg/kg, 0/5; at 80 mg/kg, 0/5; and at 160 mg/kg, 0/5. p-Amino-alpha-(1-aminoethyl)-benzyl alcohol dihydrochloride at 40 mg/kg, 0/10; at 80 mg/kg, 0/5; and at 160 mg/kg, 0/5. alpha-(1-Aminoethyl)benzyl alcohol hydrochloride, at 80 mg/kg, 2/10; and at 160 mg/kg, 0/10.

I claim:

1. The method of producing nasal vasoconstriction in a warm-blooded mammal with nasal congestion which comprises orally administering to said mammal an effective amount of ar-amino-alpha-(1-aminoethyl)benzyl alcohol.

2. The method according to claim 1 wherein the ar-amino-alpha-(1-aminoethyl)benzyl alcohol is m-amino-alpha-(1-aminoethyl)benzyl alcohol.

3. The method according to claim 1 wherein the ar-amino-alpha-(1-aminoethyl)benzyl alcohol is p-amino-alpha-(1-aminoethyl)benzyl alcohol.

* * * * *